A. WRIGHT.
AUTOMATIC WEIGHING APPARATUS.
APPLICATION FILED OCT. 29, 1917.
1,283,012.
Patented Oct. 29, 1918.
4 SHEETS—SHEET 3.
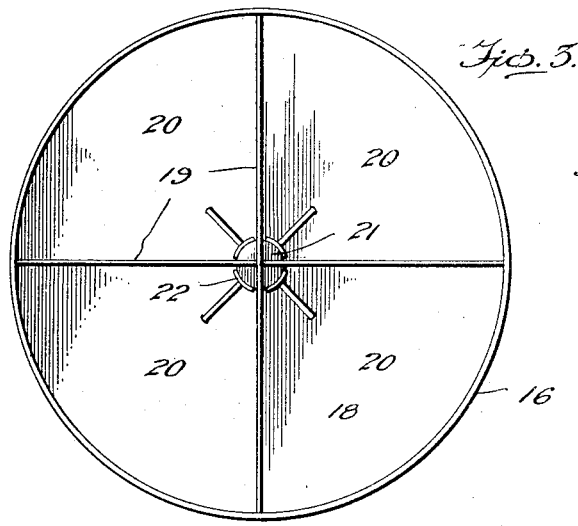
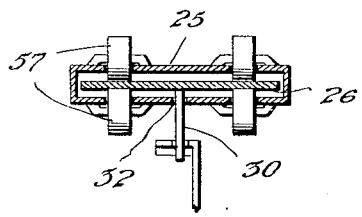
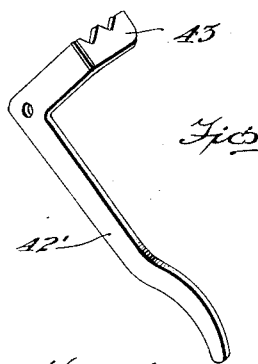
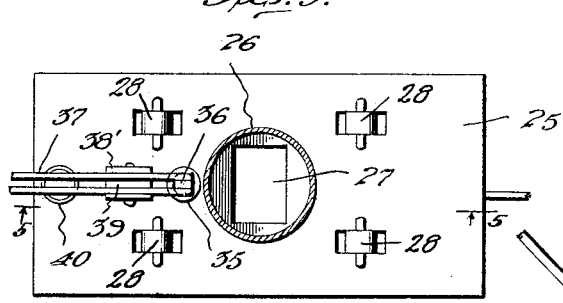
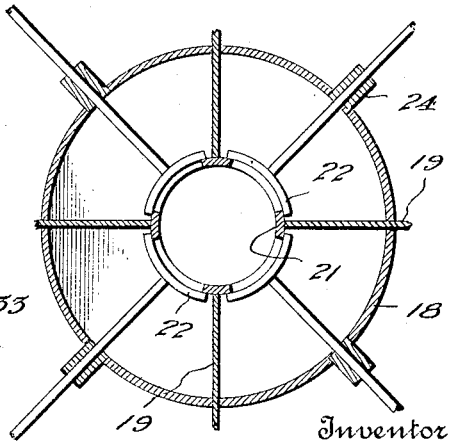
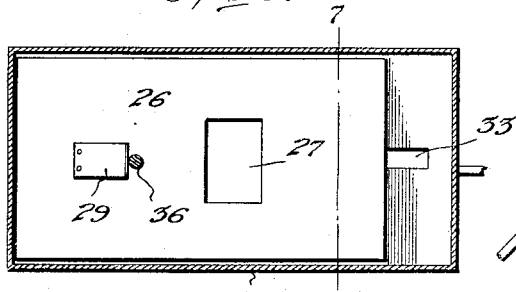
Witnesses
Paul M. Hunt
Inventor
Asa Wright.
By Victor J. Evans
Attorney

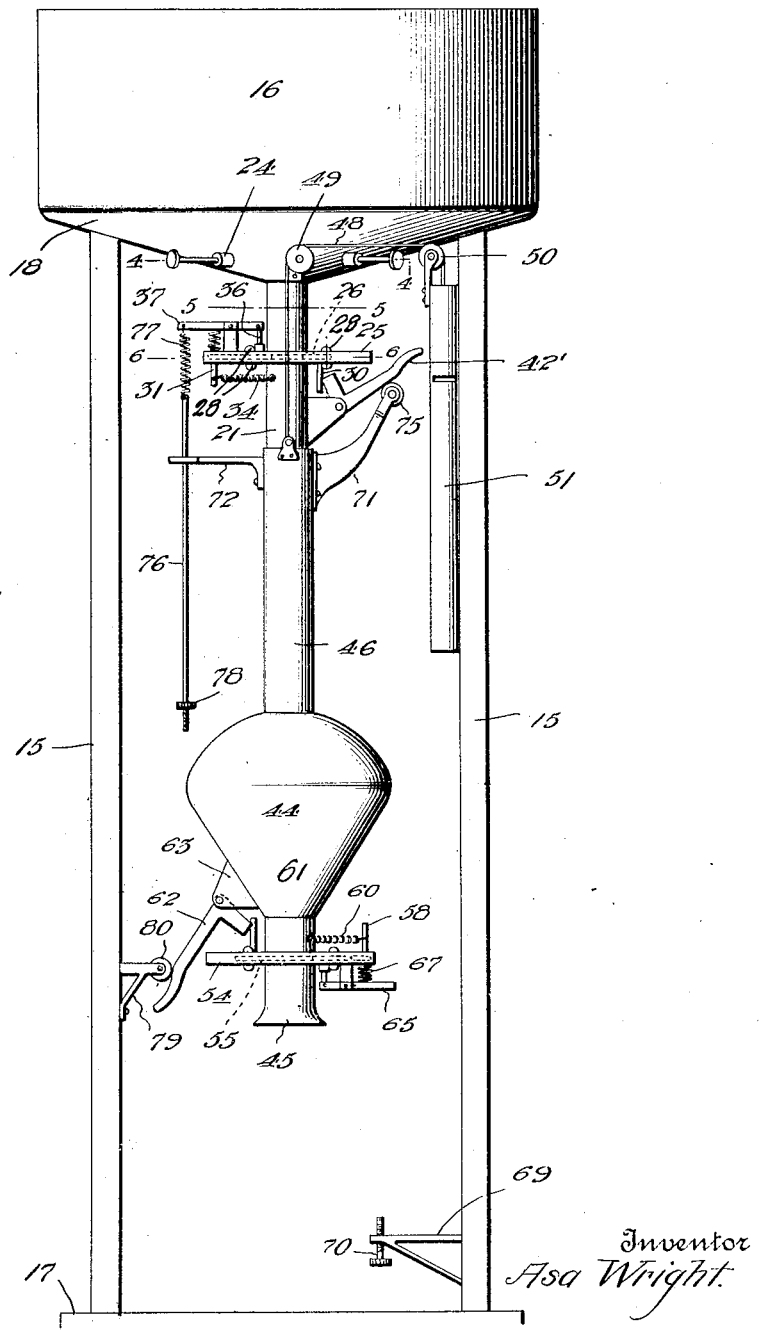

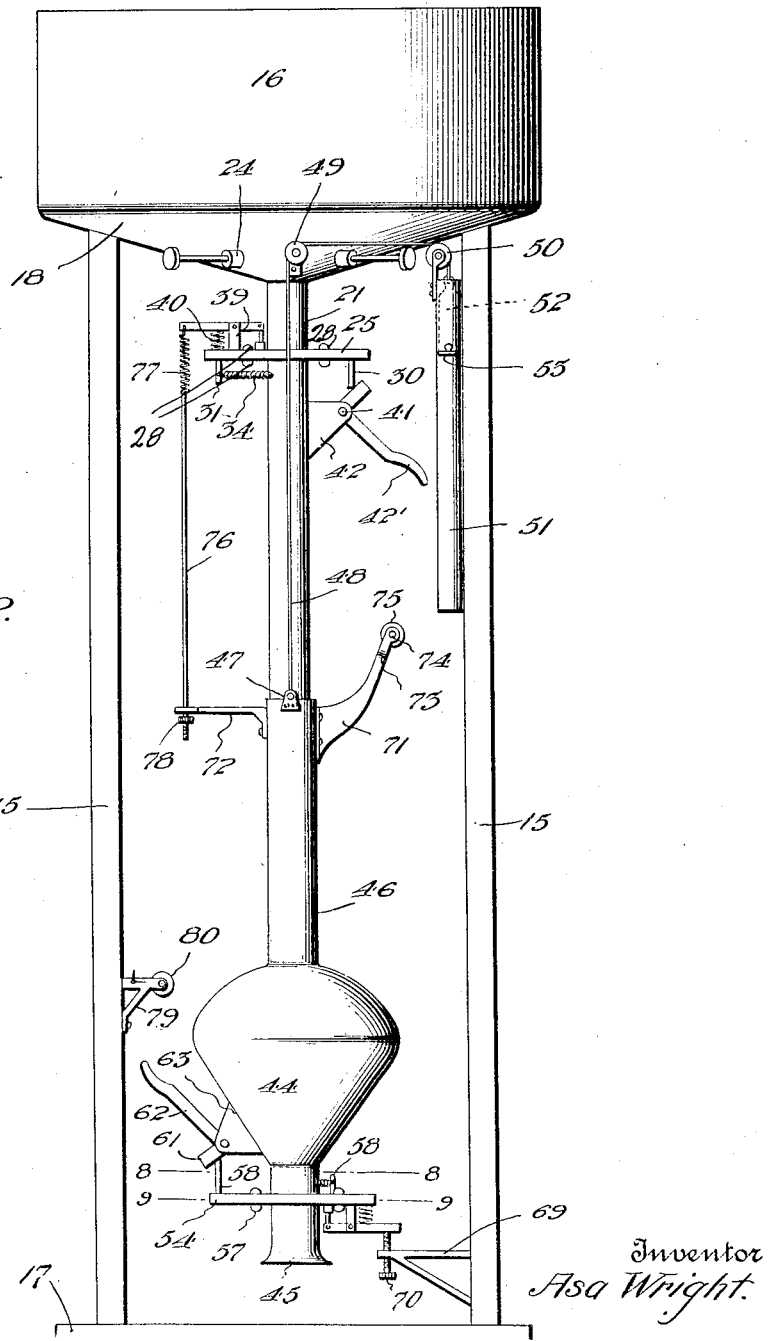

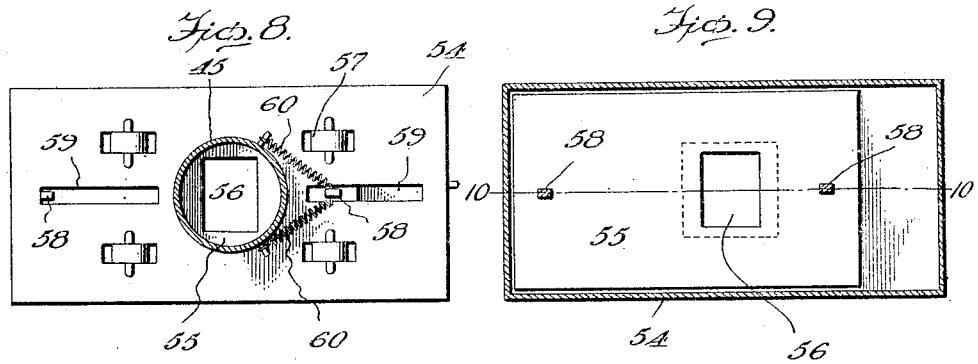
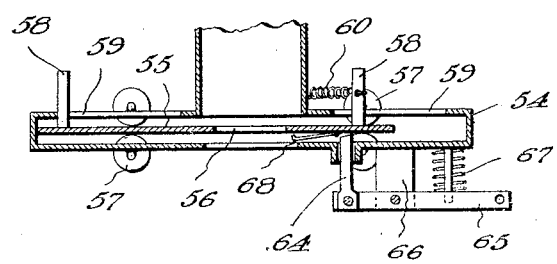
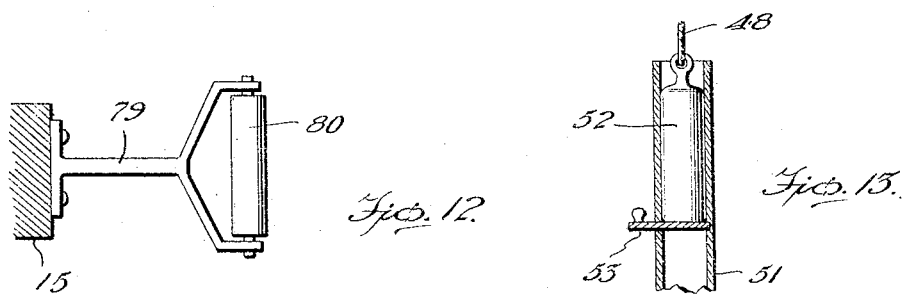
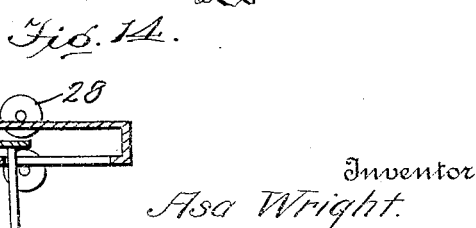

UNITED STATES PATENT OFFICE.

ASA WRIGHT, OF PONCA CITY, OKLAHOMA.

AUTOMATIC WEIGHING APPARATUS.

1,283,012. Specification of Letters Patent. Patented Oct. 29, 1918.

Application filed October 29, 1917. Serial No. 198,972.

*To all whom it may concern:*

Be it known that I, ASA WRIGHT, a citizen of the United States, residing at Ponca City, in the county of Kay and State of Oklahoma, have invented new and useful Improvements in Automatic Weighing Apparatus, of which the following is a specification.

This invention relates to an automatic weighing apparatus designed particularly for weighing and measuring grocer's commodities, such as sugar, rice, beans, and such like articles designed to be put up in various sizes of sacks and retained upon the counter for the disposal thereof.

In carrying out my invention, it is my purpose to produce an apparatus of this character including a receptacle or trough divided into any number of compartments, each holding a different article to be weighed and sacked, the receptacle or trough having a single outlet spout, each of the separate compartments having a valve communicating with the spout, while arranged for vertical movement upon the spout, is a weighing hopper which is drawn upward of the spout by a desired weight and which, when in its said supper position will automatically open a valve controlling the outlet of a spout and close a valve controlling the outlet of the weighing hopper. When the said hopper receives a desired quantity of produce, the same, by the weight thereof, descends, and in so doing, will close the outlet in the receptacle spout and when the said weighing hopper has reached the limit of its downward movement, the outlet valve thereof will be automatically opened so that the produce may be fed therefrom to the bag or sack arranged to receive the contents therefrom.

A further object of the invention is to produce a weighing apparatus which shall be constructed of a few simple parts, which shall be automatic in its action, which shall be accurate and which may be continuously operated until the desired number of sacks are filled, but wherein the action thereof may be halted at any desired interval.

Other objects and advantages will present themselves as the nature of the invention is better understood, reference being had to the accompanying drawings, in which:

Figure 1 is a side elevation of a weighing apparatus constructed in accordance with the present invention, the weighing hopper being in its elevated position.

Fig. 2 is a similar view but illustrating the position of the weighing hopper when the valve controlling the outlet thereof has been actuated to discharge the contents through the said hopper.

Fig. 3 is a top plan view.

Fig. 4 is a sectional view approximately on the line 4—4 of Fig. 1.

Fig. 5 is a sectional view approximately on the line 5—5 of Fig. 1.

Fig. 6 is a sectional view approximately on the line 6—6 of Fig. 1.

Fig. 7 is a sectional view approximately on the line 7—7 of Fig. 6.

Fig. 8 is a sectional view approximately on the line 8—8 of Fig. 2.

Fig. 9 is a sectional view approximately on the line 9—9 of Fig. 2.

Fig. 10 is a sectional view approximately on the line 10—10 of Fig. 9, and

Figs. 11 to 13 illustrate details.

Fig. 14 is a sectional view approximately on the line 14—14 of Fig. 5.

Upon suitable standards 15—15 is a receptacle 16, the said standards, at the lower ends thereof, being preferably arranged upon a suitable platform 17. The receptacle 16 is provided with an inwardly flared or conical bottom 18, and the said receptacle is provided with a plurality of vertically disposed, angularly arranged partitions 19 dividing the said receptacle into a plurality of compartments 20, and each of these compartments is designed to have stored therein a desired commodity, such as is commonly retained in bulk in a grocery and which, in the course of trade, is designed to be put up in different sized sacks, in accordance with the quantity of the article desired by the purchaser. In common practice, the sacks to be filled are placed upon an ordinary scale which is arranged in close proximity to the barrel or other container having the article therein to be weighed and sacked. The material is scooped from the barrel or container and is fed into the mouth of the sack which, as stated, is arranged on a scale. This occasions a considerable amount of time and labor upon the part of the operator, and in addition to this, the weighing of the commodity is not at all times accurate, as the operator, in his anxiety to complete his task may permit one of the sacks to contain a less quantity of the desired material than another sack. With my device, I provide for the ready filling of the sacks as well as the accurate weighing of the material to be delivered to the sacks.

The conical body 18 of the receptacle 16 is provided with a tubular extension 21 which may project into the receptacle 16 and have its upper end closed and secured to the several partitions 19, the said upper portion of the tube or spout 21 being provided with openings, communicating with the respective compartments 20 and each of these openings is closed by a valve 22 that is operated by a suitable handled stem extending through suitable packing boxes 24 through the receptacle 16. By this arrangement, it will be noted that the outlets from the separate compartments or bins 20 may be either opened or closed as desired, so that the quantity of the material from any of the said bins may find an outlet from the receptacle 16 through the tube 21.

The tube 21, at a suitable distance below its connection with the conical end 18 of the receptacle 16, is preferably divided, or cut away transversely to receive between the sections comprising the said spout or tube, a flat substantially rectangular hollow casing 25. The casing, has its upper and lower plates provided with openings communicating with the spout or tube sections 21 and arranged for longitudinal movement in the casing 25 is a flat plate 26, the same being provided with an opening 27 designed, when the plate is moved to one position to register with the bore of the spout 21, and when the said plate 26 is moved to another position to close the communication between the sections of the spout. The rectangular casing 25 upon its opposite faces, has journaled thereon roller members 28 which contact with the opposite faces of the flat plate or valve 26, and in addition to this, there is arranged between the casing and the flat plate or valve 26 flat springs 29 to insure a frictional engagement and a tight joint between the upper section of the spout 21 and the valve casing 25. The flat valve or plate 26, upon its under face, and adjacent both of its ends is provided with extending lugs 30 and 31 respectively, arranged for movement through elongated slots 32 and 33 respectively in the under face of the casing 25. To the lug 31 is secured angularly disposed spring members 34 which are secured to the lower spout section and which are designed to slide the valve 26 through its casing to normally close the communication between the spout sections and consequently close the outlet of the respective bins even when the outlet valves therefor have been operated to open the same, the casing 25, upon its upper face, is provided with an opening surrounded by a small sleeve 35, the said sleeve providing a guide for a catch or dog 36 loosely pivoted to one end of a lever 37. The lever, outward of the dog 36 is pivotally secured, as at 38, in the bifurcated end of an upright 38' of a lug or standard 39 secured to the said upper face of the casing 25 and the lever 37 is influenced by a spring 40 to normally swing the dog through the sleeve 35 and the opening in the casing to cause the said dog to engage with an obstruction, such as one of the springs 29, when the said spring is secured to the plate 26, to hold the plate or valve 26 in a position where its opening 27 registers with the opening in the section of the tube 21.

Pivotally secured, as at 41, in a suitable bracket 42 secured to one side of the lower section of the spout 21 below the valve casing 25 is a trip or valve actuating member 42'. This member comprises an angle lever, the upper arm of which is offset, as at 43, so that the said offset portion is in the path of contact with the lug 30, and when the lower arm of the said lever is engaged in a manner which will presently be described, the said lever is swung to cause the said portion 43 by engaging with the said lug 30 to slide the valve to bring the same to its open position, the said valve being retained in its open position.

The weighing hopper 44 comprises a hollow substantially dome-shaped member having at its lower and reduced end an outlet spout 45, while communicating with the upper end of the said hopper is a tubular sleeve 46. The sleeve 46 snugly receives the lower section of the spout 21, and the upper end of the sleeve 46 has secured thereto diametrically opposite brackets 47 to which are connected flexible elements 48, the said elements being trained over grooved pulley wheels 49—49 and 50 respectively. The pulley wheels may be, if desired, provided with ball bearing journals, the shaft for the diametrically opposite pulley or grooved wheels 49 being secured upon suitable brackets, or in any other desired manner, to the conical bottom 18 of the receptacle 16, while the pulley or grooved wheel 50 has its shaft connected to the upper and open end of a well 51, which is secured upon one of the standards 15, and both of the flexible elements 48 are trained over the said pulley wheel 50 and are connected to a weight 52 arranged in the well 51. The well preferably comprises a cylindrical member which may have its lower end closed, and the same at a suitable distance from its open top is provided with an opening within which is arranged a slide 53, the outer end of which being formed with a suitable handle, and this slide when arranged in the well is designed to support the weight 52.

The outlet spout of the weighing hopper 44 is provided with a flat substantially rectangular casing 54 similar to the casing 25, the said spout 45 being divided to receive the said casing 54, and the upper and lower wheels of the said casing have openings registering with the opening or bore of the spout 45. Within the casing 54 is arranged a flat valve 55 similar to the valve 26, the said valve having an opening 56 designed, when the valve is moved to one position to register with the bore or passage in the spout 45, and when the said valve is moved to another position, the said opening 56 will be brought out of register with the passage of the spout so as to close the said spout. The valve 55 is arranged for slidable movement between the upper and lower plates of the casing 54 upon anti-frictional bearings 57, while spring means 68 arranged between the casing and the valve hold the same in frictional contact with the said casing, such contact being not sufficient to interfere with the free sliding of the valve, but being sufficient to prevent the escape of the substance being weighed from the hopper 44 through the spout 45 or prevent the said substance entering the valve casing 54, the springs 29 for the valve 26 being designed for the same purpose in connection with the outlet spout of the receptacle 16. The flat valve 55, adjacent the ends thereof, is provided with extending lugs 58 passing though suitable openings 59, in this instance, in the upper face of the casing 54, one of the lugs 58 having secured thereto springs 60 that are likewise connected to the spout 45 of the hopper 44 for normally sliding the valve to move the same to an open position, and the second lug 58 is arranged in the path of contact with the angle end 61 of a trip lever 62 that is pivotally secured to a bracket 63 carried by the hopper 44, and which lever when operated is designed to move the valve to its closed position or to bring the opening 56 thereof out of alinement with the outlet spout 45. The valve is designed to be retained in its open position after the trip 62 has been actuated, in a manner which will presently be described, through the medium of a dog 64, similar to the dog 36, the said dog being loosely connected to one end of a lever 65, the said lever being pivoted to a short post or standard 66 on the under face of the casing 54 and being under the influence of a spring 67. The spring 67 causes the lever 65 to be swung on its pivot. The dog 64 has its engaging end passing through a suitable opening in the under face of the casing 54, and is thus forced normally against the under face of the valve 55. The under face of the valve may be provided with a depression to receive the active end of the dog or with an obstruction with which the said dog will engage to hold the valve in its open position against the influence of the springs 60.

To one of the standards 15 is secured an inwardly extending bracket 69, the outer end of which having a threaded aperture receiving a threaded adjustable element 70, and this element is designed to be arranged in the path of contact with the outer end of the lever 65, whereby to swing the lever upon its pivot to retract the dog 64 and to permit the springs actuating the valve 55 to bring the opening thereof into register with the bore of the outlet spout 45 to permit the contents from the weighing hopper 44 to flow through the said spout 45.

Upon the upper end of the sleeve 46, at diametrically opposite points, approximately centrally between the brackets 47, are bracket members or arms 71 and 72 respectively. The member 71 is inclined upwardly and has its end bifurcated as at 73, the arms provided by the said bifurcation having openings to receive the shaft 74 of a roller 75, and this roller is arranged in the path of contact with the lower arm of the trip 42' for the valve 26 in the casing 25. The member 72 has its outer end flat and arranged horizontally and provided with an opening through which passes a wire 76, the said wire, adjacent its upper end having secured thereto a comparatively light helical spring 77, the said spring being secured to the outer end of the lever 37 for the dog 36. The lower end of the wire or rod 76 is threaded for a considerable length and has screwed thereon a nut 78.

Upon the standard 15 opposite the standard to which the well 61 is secured and to which the bracket 69 is likewise secured, is arranged an inwardly extending arm or bracket 79, the same having its inner end bifurcated, receiving in the said bifurcation a shaft upon which is journaled a roller 80. This roller is disposed in the path of contact with the trip lever 62, and when the weighing hopper is moved upwardly toward the receptacle 16, under the influence of the weight 52, the said roller 80 will engage with the trip 62 swinging the same to slide the valve 55 to its closed position. Simultaneous with this movement, or at a suitable interval after the actuation of the valve 55, the roller 75 is brought into contacting engagement with the trip 42' swinging the said trip upon its pivot 41 and opening the valve 26. It is, of course, to be understood that the slide 53 has been removed from the well to permit of the gravitation of the weight 52 therein, and it will also be apparent that the valve of one of the bins has been opened to permit of the contents thereof flowing from one of the bins 20 through the spout 21 into the weighing hopper 44. When the weight of the material in the hopper counterbalances the weight 52, the said hopper will gravitate downwardly from the receptacle 16, causing the arms 72 to contact with the adjustable stop 78 upon the wire 76, and through the medium of the spring 77 exerting a jerking action on the said wire to swing the lever 37 and bring the dog 36 out of engagement with the valve 26 to permit of the spring sliding the said valve to its closed position. It is to be understood that the sack to be filled is properly arranged to receive the outlet spout 45 of the hopper 44 upon the passing of the said hopper, and the member 70 may be so adjusted as to regulate the time, after which the valve 26 has been closed in which the said member will contact with the lever 65 to swing the same to bring the dog 64 out of locking engagement with the valve 55 and permit the springs controlling the said valve to slide the same to open the passage between the weighing hopper and its outlet spout 45. It will be apparent that as long as the weight 52 is retained upon the cables 48, the weighing hopper 44 will again ascend after the contents thereof have been delivered into the sack and the device will operate as above described. It is also to be understood that various weights may be secured to the flexible element 48 in accordance with the different quantities of the commodities to be sacked, and from the foregoing description, when taken in connection with the drawings, the simplicity and advantages of the construction will, it is thought, be apparent without further detailed description.

Having thus described the invention, what I claim is:

1. In an automatic weighing apparatus, a storage receptacle having a valved outlet spout, a weighing hopper having a sleeve surrounding said spout, a weight for sliding the hopper toward the receptacle, means on the sleeve for opening the valve of the spout when the valve is in elevated position, and means also on the sleeve for closing the valve when the hopper is in its lower position.

2. In an automatic weighing apparatus, a storage receptacle divided into bins, a valved outlet spout for the receptacle and communicating with each of the bins, a valve between said spout and each of said bins, a weighing hopper having a sleeve surrounding the spout, a weight for sliding the hopper toward the receptacle, means upon the sleeve for opening the valve of the spout when the hopper is in elevated position, and means also on the sleeve for closing the valve when the hopper is in its lower position.

3. In an automatic weighing apparatus, a storage receptacle having an outlet spout, a horizontally disposed, spring influenced slidable, normally closed valve for the spout, a sleeve surrounding the spout, a weight for sliding the hopper toward the receptacle, means upon the sleeve designed to actuate the valve to open the same, when the hopper is in its elevated position, means for holding the said valve in its said open position, and means upon the sleeve designed to actuate said last mentioned means when the hopper is in its lower position to permit of the springs of the said valve closing the same.

4. In an automatic weighing apparatus, a storage receptacle having a conical bottom, a spout communicating with and depending from the bottom, a horizontally disposed valve casing in the spout, a spring influenced, normally closed flat valve in the casing for the spout, lugs upon the valve projecting through openings in the casing, an angular pivoted trip member within the path of contact with one of said lugs, a weighing hopper having a sleeve surrounding the spout, a contact member upon the sleeve designed to engage with the trip to slide the valve to open position, means upon the casing to engage with the valve to retain the valve in its said open position, and means, upon the sleeve, designed to influence said valve retaining means, when the hopper is in its lower position, to permit of the spring means for the valve sliding the same to closed position.

5. In an automatic weighing apparatus, a storage receptacle having partitions therein dividing the same into a plurality of hoppers, an outlet spout at the bottom of the receptacle, communicating with all of the hoppers, a valve between the spout and each of the hoppers, an operating stem therefor, a horizontally disposed valve casing in the spout, a flat slidable valve in the casing, lugs upon the valve extending through elongated openings in one of the walls of the casing, anti-frictional rollers for the valve, spring means between the valve and casing for retaining the said valve in contacting engagement with one of the walls of the casing, an angular trip member pivoted to the spout and arranged in the path of contact with one of the lugs, spring means between the outer lug and the spout for normally sliding the valve to closed position, a dog entering the casing and designed to engage with the valve when the same is in its open position, to retain the said valve in such position, a spring influenced pivoted lever for the dog, a weighing hopper having a sleeve surrounding the spout, a weight for sliding the hopper toward the receptacle, a contact member on the sleeve designed to engage with the trip member to swing the same, and cause the said trip member to contact with the lug and slide the valve to is open position, and means also on the sleeve designed to swing the lever to release the dog from the valve to permit of the springs sliding the valve to its closed position, when the hopper is in its lower position on the spout.

6. In an automatic weighing apparatus, standards, a storage receptacle supported on said standards, a depending spout centrally connected with the receptacle, a normally closed valve in the spout, a weighing hopper having a sleeve surrounding the spout, said hopper having an outlet spout at the bottom thereof, a valve in said spout, means, comprising a weight, for sliding the spout toward the receptacle, means between one of the standards and the valve in the spout of the weighing hopper for moving the valve to closed position when the hopper is elevated, means, upon the sleeve, for influencing the valve in the spout to open the same when the hopper is elevated, means, between the sleeve and the valve in the spout of the hopper, for closing the said valve when the hopper is partially lowered, and means, between the second standard and the valve in the outlet spout of the hopper for opening the said valve when the hopper is fully lowered.

7. In an automatic weighing apparatus, standards, a storage receptacle having a conical bottom supported on said standards, said receptacle being divided into a plurality of bins, an outlet spout at the bottom of the receptacle communicating with all of the bins, a valve between each of the bins and the said spout, an operating element for each of the valves, a valve in the spout, a weighing hopper having a sleeve surrounding the spout, a well on one of the standards, a weight therein, a slide for supporting the weight in one position, flexible elements connected with the weight, grooved wheels for the flexible elements, and said flexible elements being connected to the sleeve of the hopper, a valve in the outlet of the hopper, means, on one of the standards, designed to influence said valve to close the same when the hopper is raised toward the receptacle, means upon the sleeve for co-engaging with the valve in the outlet spout of the receptacle for moving the same to an open position when the hopper is elevated, means between the sleeve and the valve in the said spout for actuating the valve to permit of the closing thereof when the hopper is partly lowered, adjustable elements associated with said means, and an adjustable element upon one of the standards designed to coöperate with the valve in the outlet of the hopper for opening the said valve, when the hopper is fully lowered.

In testimony whereof I affix my signature

ASA WRIGHT.

Copies of this patent may be obtained for five cents each, by addressing the "Commissioner of Patents, Washington, D. C."